UNITED STATES PATENT OFFICE.

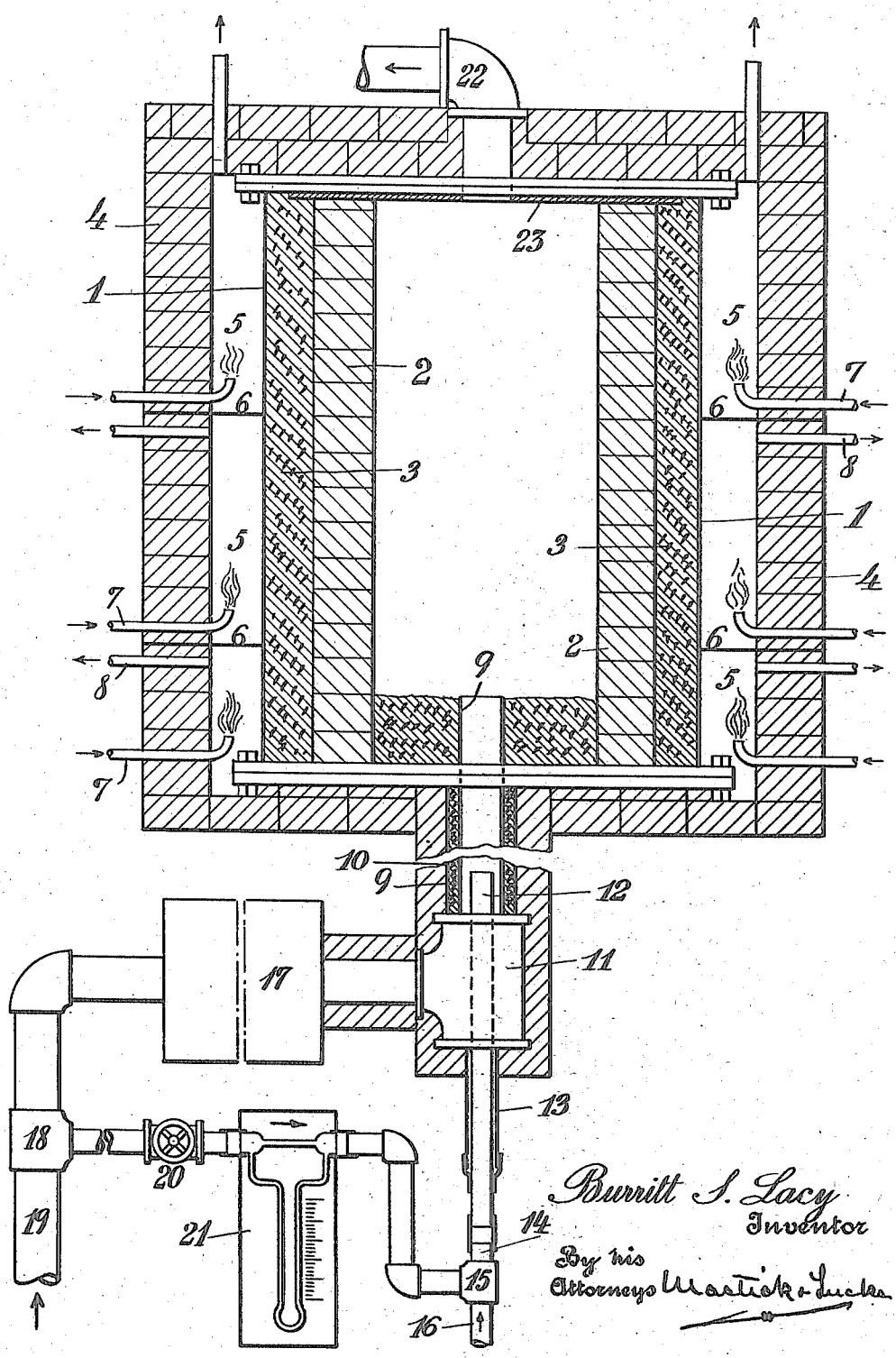

BURRITT S. LACY, OF SEWAREN, NEW JERSEY, ASSIGNOR TO THE ROESSLER & HASSLACHER CHEMICAL COMPANY, OF NEW YORK, N. Y., A CORPORATION OF NEW YORK.

PROCESS OF MANUFACTURING HALOGEN PRODUCTS OF HYDROCARBONS.

1,286,353.   Specification of Letters Patent.   Patented Dec. 3, 1918.

Application filed October 6, 1915. Serial No. 54,321.

*To all whom it may concern:*

Be it known that I, BURRITT S. LACY, a citizen of the United States, and a resident of Sewaren, in the county of Middlesex and State of New Jersey, have invented certain new and useful Improvements in Processes of Manufacturing Halogen Products of Hydrocarbons, of which the following is a specification.

The invention relates to manufacturing halogen products of hydrocarbons and it relates particularly to the manufacture of chlorin-products of hydrocarbons, the object of the invention being to simplify the operation of the process and to safeguard the reaction against the formation of undesirable by-products.

I shall describe my invention, by way of example, as applied to the particular art of chlorinating methane, the same general method being also applicable to the chlorination of many other substances, for example, ethane and methylene chlorid, as well as to the halogenation of hydrocarbons in general.

In U. S. Patents No. 1,111,842 and No. 1,190,659, I have described a method of chlorinating methane in which by the use of a large excess of methane two objects are attained, namely a smooth reaction free from carbonization and a product which consists chiefly of monochlor methane.

The simplest method of carrying out the operation is to mix the chlorin and methane in the cold and then pass the mixture into the heated reaction vessel, which, as described in U. S. Patent No. 1,111,842 may be of silica, brick or other suitable material, but of course not of a material which like most metals, is readily attacked by hot chlorin.

There are, however, disadvantages connected with the use of non-metallic substances like silica or brick, more especially the difficulty of making and maintaining them gas-tight under the temperature involved in the chlorination vessel. On the other hand, most metals are more or less attacked by hot chlorin, or they have an unfavorable action in that they tend to catalyze the reaction

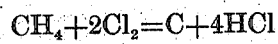

What I have discovered and desire to protect by Letters Patent is a method by which the advantages of both classes of materials may be combined and their disadvantages avoided, as will be seen from the following description of my new process and of the apparatus used in carrying out the same, reference being had in connection with said description to the accompanying drawing which represents in a rather disagrammatical way a view partly in section of one form of apparatus which I may use in carrying out my process.

The general idea governing the construction of the apparatus is to avoid corrosion of the material and the harmful influences of the products formed thereby as well as to provide a chlorin-resistant lining in a gastight, metallic shell serving as a reaction chamber, as will be further described below.

The apparatus consists therefore of a cylindrical iron shell 1 with a lining 2 composed of an "acid tile" brick or of silica, as for instance of a section of a silica pipe. This space between shell 1 and lining 2 is filled up with finely ground flint 3 which is nearly pure silica. The shell 1 is surrounded by a furnace 4 with suitable flues 5, said flues being divided by partitions 6 into separate heating compartments which serve to heat the shell by the burning therein, for instance of gas, supplied by pipes 7, the combustion gases leaving through exit pipes 8.

The shell 1 is connected to a silica pipe 9 which is surrounded by an iron pipe 10, the space between the two pipes being filled with ground flint, pipe 9 extending up into space within the shell. The iron pipe 10 is attached to the iron T-piece 11, through which passes another silica pipe 12 the lower portion of which is covered by an iron pipe 13, pipe 12 extending up into pipe 9; the outer end of silica pipe 12 is connected through an iron pipe 14 with the iron T-piece 15, which is fitted with the pipe 16. The connections between 11 and 13 and between 12 and 14 are made gas tight by rubber tubing, cement or other suitable means. The branch of T-piece 11 is connected to a heating furnace 17, which is connected through the iron T-piece 18 to pipe 19, for admission of methane. The branch of the T-piece 18 is connected to the branch of the T-piece 15 through a regulating valve 20 and a gas flow measuring device 21.

The entire current of methane enters through pipe 19, the current of chlorin through pipe 16; furthermore as will be described, any desired proportion of the methane current may be diverted through the valve 20 into the T-piece 15 where it mixes with the chlorin and passes on through the silica pipe 12.

The remainder of the methane current passes on through the heater 17 into the silica pipe 9, in which at the orifice of the silica pipe 12 it meets the chlorin-containing gas. The total gas mixture enters the shell 1 through the silica pipe 9, and leaves the shell 1 through the iron pipe 22.

The wall through which the exit pipe 22 passes may be left unprotected by acid brick or ground flint, since in the gases which come in contact with it the proportion of free unreacted chlorin is extremely small.

In case of need of such protection, such a lining may be easily provided by a plate 23 of material resistant to the corrosive action.

Where necessary to avoid heat losses, for example in connection with pipe 10 and T-piece 11 a covering of asbestos or other suitable heat insulating material may be employed.

If now chlorin alone were passed through the reaction vessel as above described, the tendency of the powdered flint would, it is true, be to hinder the diffusion of the chlorin through to the iron shell; nevertheless, at the high temperature of the furnace more or less chlorin would come in contact with the shell with consequent corrosion of the latter in the course of time. In the case of chlorination of methane, however, I have found that this is practically prevented, for during the progress of the gas mixture through pipe 9 complete reaction of the chlorin occurs. Consequently when the gas mixture reaches the surface of the shell, practically no free chlorin remains, but only combined chlorin in the form of hydrochloric acid, which, as is well known, has little or no effect on iron at temperatures around 400° C.

The reaction vessel as shown in Figure 1 is provided with suitable means, such as gas pipes 7, in the flues 5 for heating the iron shell. The layer 3 of powdered flint however, and the lining 2 itself, are poor conductors of heat; consequently it is not as easy nor as economical to furnish the heat necessary to bring the current of reaction gas up to the reaction temperature as it would be if a simple iron vessel could be employed.

As was stated in my Patent No. 1,190,659, by using a reaction mixture containing 4 to 6 volumes of methane to 1 volume of chlorin gas, the heat of the chemical reaction itself is sufficient to warm up the reaction mixture to the reaction temperature. When, however, it is desired to restrict the product essentially to monochlor methane, a larger proportion of methane, for example 15 volumes methane to 1 volume of chlorin gas, is necessary; but the heat of the reaction is now sufficient to heat up the gas mixture to only about 200° C. instead of to the required 400° C. or more, consequently efforts must be made to overcome the shortage in the reaction heat by some other means.

While trying to solve this problem, I found that preheating the applied methane affords a convenient and economical means for accomplishing the desired result; for, since hot methane (in the absence of chlorin) has no effect on metals such as iron or copper, the methane may be heated with great ease by passing it through a metal vessel which is maintained at a suitable temperature.

In pursuance of this idea I preheated methane to about 260° in a copper pipe, but at its subsequent mixing with the chlorin I encountered a serious difficulty, namely the tendency toward the formation of a flame of chlorin at the orifice of the introduction pipe, the flame burning in the methane at the mixing point. When the reaction once "strikes back" from the furnace proper, which it tends to do even with the above mentioned degree of preheating, a chlorin flame in methane is produced, and when produced maintains itself as long as the chlorin is passed. This phenomenon is accompanied by a total change in the character of the reaction. That is, instead of the smooth reaction (free from deposition of carbon), as follows:

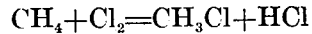
$$CH_4 + Cl_2 = CH_3Cl + HCl$$

together with a small amount of the reaction

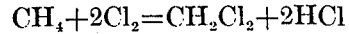
$$CH_4 + 2Cl_2 = CH_2Cl_2 + 2HCl$$

which may have been going on, we have a sudden change to the reaction

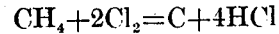
$$CH_4 + 2Cl_2 = C + 4HCl$$

accompanied by clouds of "smoke" consisting of carbon black. This of course means a complete failure of the process.

On further experimenting, however, I made the discovery that this difficulty could be entirely avoided if I proceed in the operation of the process in the following way. A portion, for instance, about 5 volumes or ⅓ of the 15 volumes of methane is introduced through valve 20 into T-piece 15, where it mixes while still at ordinary temperature, with the 1 volume of chlorin admitted through pipe 16, and the resultant mixture is then passed through the silica pipe 12 into the silica pipe 9 entering the shell 1. When the mixture of 5 methane to 1 chlorin enters pipe 9 it meets there the current of 10 volumes of methane, which has been preheated to about 370° C. in the heater 17, whereby a total mixture of 15 volumes of methane to 1 volume chlorin at a temperature of about 250° C. is obtained, but the formation of a chlorin flame is now completely prevented; the reaction going on between the constituents is perfectly smooth and the deposition of carbon does not take place.

By referring to the accompanying drawing, which represents an upright furnace, it will be easily understood that the layer of ground flint between shell 1 and lining 2 as well as at the bottom of shell 1 will settle down and automatically stop up any cracks which form in or between the bricks, and thus at all times make it impossible for currents of gas to pass outward to the iron shell.

The gas heating merely serves to balance radiation losses, external heat being thus supplied to the outside of the iron shell of the reaction vessel only in amount sufficient to keep it at about the same temperature as that existing within the vessel, while the reaction mixture itself is heated entirely by the "internal heat" furnished by the chemical reaction between the gases already partly warmed up as a result of the preheating of the methane before entering the reaction vessel.

On a large scale where the loss of heat through the walls of the reaction vessel is relatively much less important, the external heat which has to be applied to the iron shell, may of course, be decreased, or even be dispensed with entirely; since in this latter case, if the walls of the furnace 4 are made of a substantial thickness, the reaction gases will cool down by only a few degrees, and this loss may be compensated for by a slightly higher degree of preheating.

Consequently no heat whatever need pass through the walls of the reaction vessel, from which it follows that the layer of powdered silica may be rather thick without effecting the efficiency of the process. The inside temperature of the reaction vessel naturally increases progressively from the orifice of pipe 12, which is, in the above example, at a temperature of about 250°, up to the point, which may be about the middle of the furnace, where the reaction has practically completed itself as far as appreciable evolution of heat is concerned; at this point the temperature in the gas mixture is about 450°, and the temperature of the corresponding part of the outside of the iron shell as well as the remainder of the furnace is maintained at about the same temperature, for instance between 400°–500° C., thus allowing the completion of the reaction, by which it may be insured that only a trace, for example 0.01% or even less, of the original chlorin remains unreacted.

Furthermore the above arrangement easily permits rapid variation as desired in the temperature of the gases in the reaction vessel; thus by opening valve 20 wider, a smaller proportion of the methane is preheated, consequently the temperature of the total gas mixture where it enters the reaction vessel through the pipe 9, will immediately drop; the final temperature to which the gases are brought by the heat of reaction will of course, also be reduced. In this manner by means of the valve 20, as well as by regulation of the temperature to which the methane is preheated in the heater 17, the temperatures produced in the reaction vessel may be controlled within wide limits.

While in the foregoing, I have described the application of my invention to the chlorination of methane, I do not limit myself to the case of methane or to the particular conditions described in the foregoing, as it is obvious that the same principles may be employed in the chlorination of methane and other hydrocarbons as well as in such processes as the chlorination of methylene chlorin, according to the method described in my copending application, Serial No. 852,163, filed July 21, 1914, as well as to processes of halogenating hydrocarbons. In general, the reaction temperature, for this kind of process varies from 300° to 500° C. and the preheating may therefore be conveniently arranged to allow the operation of these processes according to the method disclosed above.

I claim:—

1. The process of halogenating hydrocarbons, consisting in preparing a mixture of the halogen with an excess of the hydrocarbon gas at ordinary temperature, admitting a further excess of the latter gas at an elevated temperature to the mixture and causing the total mixture to react.

2. The process of halogenating hydrocarbons, consisting in preparing a mixture of the halogen with an excess of the hydrocarbon gas at ordinary temperature, admitting a further excess of the latter gas at an elevated temperature to the mixture and causing a reaction of the total mixture of gases at a temperature above said elevated temperature.

3. The process of halogenating hydrocarbons, consisting in preparing a mixture of the halogen with an excess of the hydrocarbon gas at ordinary temperature, admitting a further excess of the latter gas to the mixture in greater proportions than said first excess and at an elevated temperature and causing a reaction of the total mixture of gases at a temperature above said elevated temperature.

4. The process of halogenating hydrocarbons, consisting in preparing a mixture of the halogen with an excess of the hydrocarbon gas at ordinary temperature, elevating the temperature of said mixture by admixing with it a further excess of the hydrocarbon separately heated to a temperature below the reaction temperature and causing the total mixture to react at the normal reaction temperature.

5. The process of halogenating hydrocarbons, consisting in preparing a mixture of the halogen with an excess of the hydrocarbon at ordinary temperature, elevating the temperature of said mixture by admixing with it a further excess of the hydrocarbon separately heated to a temperature below the reaction temperature and causing the total mixture to react at a temperature from 300–500° C.

6. The process of halogenating hydrocarbons, consisting in preparing a mixture of the halogen with an excess of the hydrocarbon at ordinary temperature, heating separately to a predetermined temperature a further excess of the same gas, admixing with the cold mixture of gases the aforesaid further excess of gas thus heated and causing the total mixture to react at a temperature from 300–500° C. by controlling the temperature of the total gas mixture at the point of mixture by the regulation of the temperature to which the aforesaid further excess of gas is heated taken in connection with the heat of the halogenation reaction.

7. The process of halogenating hydrocarbons, consisting in preparing a mixture of the halogen with an excess of the hydrocarbon at ordinary temperature, heating separately to a regulated temperature a further excess of the latter gas, admixing with the cold mixture of gases the aforesaid further excess of gas thus heated, causing the total mixture to react at a temperature from 300–500° C. by controlling the temperature of the total gas mixture at the point of mixture by the regulation of the temperature to which the aforesaid excess of gas is heated taken in connection with the heat of the halogenation reaction and maintaining the reaction temperature within said range during the process.

8. The process of causing a reaction between a corrosive and a non-corrosive gas, consisting in mixing the corrosive gas with an excess of the non-corrosive gas at ordinary temperature, admitting a further excess of the non-corrosive gas at an elevated temperature to said mixture and causing the total mixture to react.

9. The process of causing a reaction between a corrosive and a non-corrosive gas, consisting in mixing a corrosive gas with an excess of the non-corrosive gas at ordinary temperature, admitting a further and greater excess of the same gas at an elevated temperature to said mixture and causing a reaction of the total mixture of gases at a temperature above said elevated temperature.

10. The process of causing a reaction between a corrosive and a non-corrosive gas, consisting in mixing a corrosive gas with an excess of a non-corrosive gas at ordinary temperature, heating separately a further excess of the non-corrosive gas, mixing the last-mentioned excess of non-corrosive gas at an elevated temperature with the cold mixture of gases, causing the total mixture to react at a temperature from 300–500° C. and regulating the temperature of the total gas mixture at the point of mixture by regulation of the temperature to which the aforesaid excess of non-corrosive gas is heated taken in connection with the heat of reaction.

11. The process of causing a reaction between a corrosive and a non-corrosive gas, consisting in mixing a corrosive gas with an excess of a non-corrosive gas at ordinary temperature in the absence of material non-resistant to the action of the corrosive gas, admitting to this mixture a further excess of the non-corrosive gas at an elevated temperature and causing the total mixture to react in the absence of material non-resistant to the action of the corrosive gas.

12. The process of causing a reaction between a corrosive and a non-corrosive gas, consisting in mixing a corrosive gas with an excess of non-corrosive gas at ordinary temperature in the absence of material non-resistant to the action of the corrosive gas, heating separately a further excess of the non-corrosive gas, admixing to the cold mixture of gases the aforesaid excess of the non-corrosive gas at an elevated temperature, causing the total mixture to react in the absence of material non-resistant to the corrosive action of the gas, within 300–500° C. and regulating at the point of mixture, the temperature of the total gas mixture together with the heat of reaction.

13. The process of causing a reaction between a corrosive and a non-corrosive gas, consisting in mixing a corrosive gas with an excess of a non-corrosive gas at ordinary temperature in the absence of material non-resistant to the action of the corrosive gas, heating separately a further excess of the non-corrosive gas, admixing to the cold mixture of gases the aforesaid excess of the non-corrosive gas at an elevated temperature, causing the total mixture to react in the absence of material non-resistant to the corrosive action of the gas within 300–500° C., regulating at the point of mixture the temperature of the total gas mixture in connection with the heat of reaction and maintaining the reaction temperature within said range during the process.

14. The process of chlorinating hydrocarbons, consisting in preparing a mixture of chlorin with an excess of gaseous hydrocarbon at ordinary temperature, admitting to the mixture thus prepared a further excess of the gaseous hydrocarbon at an elevated temperature and causing the mixture to react.

15. The process of chlorinating hydrocarbons, consisting in preparing a mixture of chlorin with an excess of the gaseous hydrocarbon at ordinary temperature, admitting to the mixture thus prepared a further excess, greater than the first mentioned excess of the gaseous hydrocarbon at an elevated temperature and causing a reaction of the total mixture of gases at a temperature above said elevated temperature.

16. The process of chlorinating hydrocarbons, consisting in preparing a mixture of chlorin and an excess of the gaseous hydrocarbon at ordinary temperature, heating separately a further excess of the gaseous hydrocarbon, admixing to the cold mixture of gases the said excess of gas at an elevated temperature, causing the total mixture to react within 300–500° C. regulating the temperature of the total gas mixture at the point of mixture in connection with the heat of reaction, and maintaining the reaction temperature within said range during the process.

17. The process of chlorinating methane, consisting in preparing a mixture of chlorin with an excess of methane at ordinary temperature, admitting a further excess of methane at an elevated temperature to said mixture and causing the total mixture to react.

18. The process of chlorinating methane, consisting in preparing a mixture of chlorin with an excess of methane at ordinary temperature, admitting a further excess of methane greater than the foregoing at an elevated temperature to said mixture and causing a reaction of the total mixture of gases at a temperature higher than said elevated temperature.

19. The process of chlorinating methane, consisting in preparing a mixture of chlorin with an excess of methane at ordinary temperature, heating separately a further excess of methane, admixing the aforesaid excess of methane at an elevated temperature with the cold mixture of the gases, causing the total mixture to react at approximately 450° C. regulating the temperature of the total gas mixture at the point of mixture to reach approximately 450° C. together with the heat of reaction, and maintaining the reaction temperature by supplying heat from outside.

20. The process of chlorinating methane, consisting in mixing one volume of chlorin gas with approximately five volumes of methane at ordinary temperature, heating separately ten volumes of methane to a temperature of approximately 370° C., admixing with the cold mixture the said ten volumes of methane at 370° C. in the absence of material non-resistant to the corrosive action of chlorin, causing the total mixture to react at approximately 450° C. and maintaining said temperature by protecting the reaction materials against loss of heat by radiation.

In testimony whereof I have signed this specification in the presence of two subscribing witnesses:

BURRITT S. LACY.

Witnesses:
WM. T. HORNSBY, Jr.,
OTTO K. ZWINGENBERGER.